July 28, 1953
C. E. NOTZ
2,646,707
METHOD FOR REPAIRING PUNCTURES
IN PNEUMATIC TIRES AND TUBES
Filed June 9, 1950
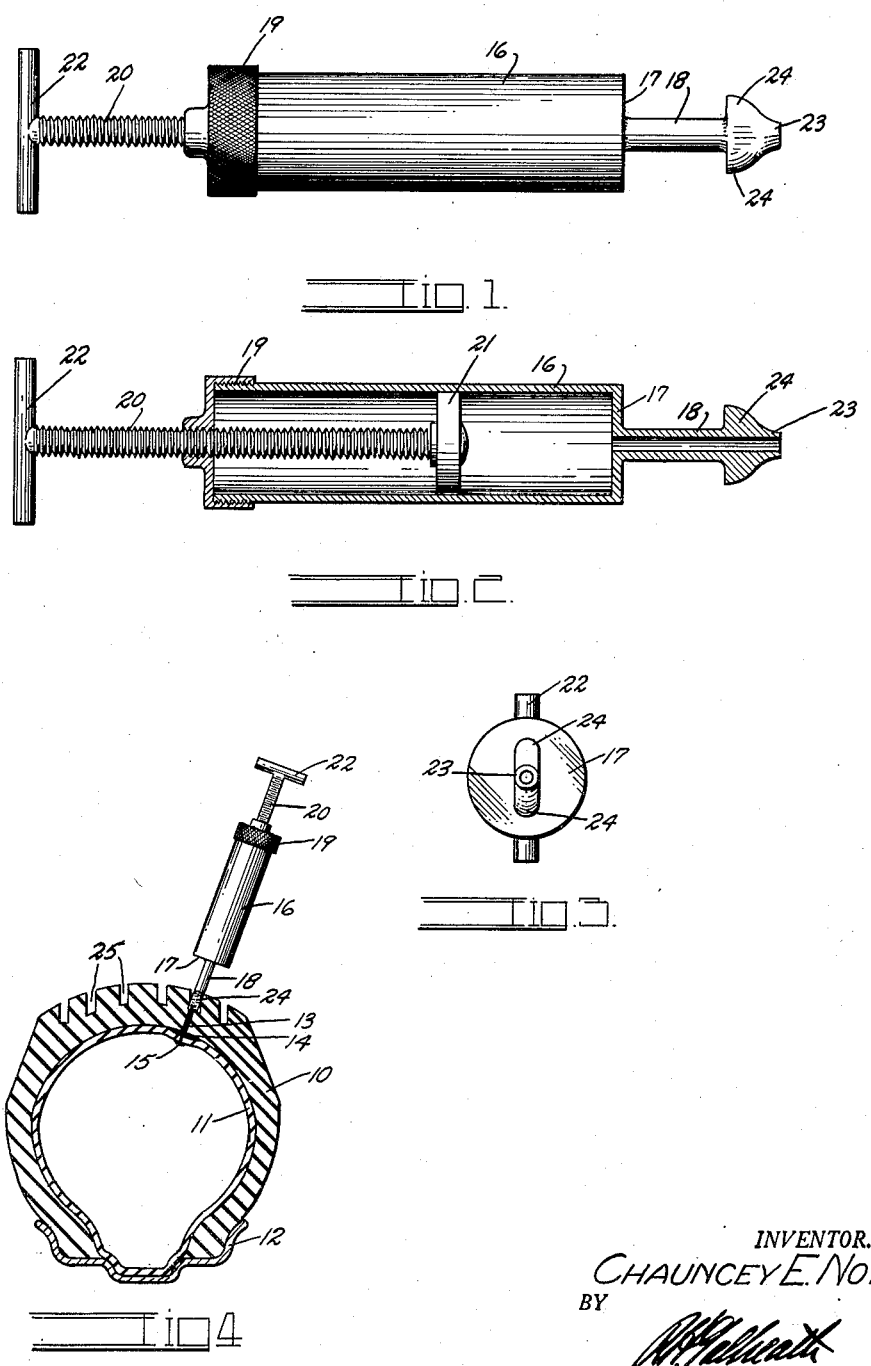
INVENTOR.
CHAUNCEY E. NOTZ
BY
ATTORNEY Patented July 28, 1953

2,646,707

UNITED STATES PATENT OFFICE 2,646,707

METHOD FOR REPAIRING PUNCTURES IN PNEUMATIC TIRES AND TUBES

Chauncey E. Notz, Englewood, Colo., assignor to Notz-Sweney, Inc., Denver, Colo.

Application June 9, 1950, Serial No. 167,223

4 Claims. (Cl. 81—15.6)

1

This invention relates to a method and means for repairing pneumatic vehicle tires and tubes, and has for its principal object the provision of a method and means whereby ordinary punctures, such as caused by nails, tacks, and the like, can be quickly and instantly repaired without removing the casing or tube of a tire from the wheel.

Other objects and advantages reside in the detailed construction of the invention, which is designed for simplicity, economy, and efficiency. These will become more apparent from the following description.

In the following detailed description of the invention, reference is had to the accompanying drawing which forms a part hereof. Like numerals refer to like parts in all views of the drawing and throughout the description.

In the drawing:

Fig. 1 is a side view of a tire repairing device employed in the improved method;

Fig. 2 is a longitudinal section through the device of Fig. 1;

Fig. 3 is a front end view thereof; and

Fig. 4 illustrates the invention in use on a typical tire casing and tube.

In Fig. 4 a conventional automobile tire casing is indicated at 10 having the usual tread design grooves 25, an inner tube is illustrated at 11 and a supporting rim at 12.

The improved method comprises forcing a latex paste of the air-setting type or other suitable puncture sealing compound through the puncture aperture in the casing 10 and over the puncture in the inner tube 11, so that the aperture in the casing is completely filled with rubber, as indicated at 13, and an outer patch 14 of rubber is formed on the exterior of the tube 11. An inner patch 15 may also be formed on the interior of the tube if desired although the outer patch 14 has been found to be sufficient to seal the puncture.

The latex composition is forced into the puncture aperture through the medium of a tool or device such as illustrated in Figs. 1, 2, and 3. The device comprises a pressure barrel 16 having a closed end 17 from which a discharge tube 18 projects. The opposite end of the barrel 16 is closed by means of a threaded, knurled cap 19.

A threaded plunger rod 20 is screwed through the cap 19, terminating on the interior of the barrel 16 in a pressure piston 21. The outer extremity of the rod 20 is provided with any suitable finger grip, such as a cross bar 22.

The extreme extremity of the discharge tube 18 terminates in a round nozzle end 23. Two oppositely flaring wings 24 may be formed on the tube

2

18 immediately back of the nozzle extremity 23. These two relatively thin, oppositely projecting wings allow the extremity of the tube to be inserted into the design grooves 25 of the casing.

In use, the barrel 16 is filled with latex compound or air-setting rubber cement or other suitable puncture sealing compound, and the nozzle extremity is entered into or placed against the puncture aperture in the casing 10. The wings 24 prevent the nozzle from being forced through the aperture. The rod 20 is rotated to cause the piston to force the cement from the tube 18 through the puncture aperture in the casing, thence between the casing and the inner tube 11 to form the outer patch 14, continued application forcing additional cement through the puncture aperture in the inner tube so as to spread onto the interior of the latter to form the inner patch 15.

The inner tube is fully inflated during the repair operation to bear against the interior wall of the casing so that pressure must be created against the outer patch 14 before the compound or cement can be forced through the tube. This automatically forms a rounded patch on the exterior of the tube of greater thickness at the center than at the edges, and this patch may be tied through to the inside of the tube if sufficient additional cement is applied to form the smaller inner patch 15.

The outer patch 14 does not permanently adhere to the casing 10 due to the fact that the rough inner surface of the latter holds dirt, soapstone, and other materials which prevent adhesion of the patch. The final result is a much more permanent and secure repair than could be obtained by the usual patching procedure, and the labor involved in the removal of the tire casing is entirely eliminated.

It will be noted that no preliminary preparation of the casing or tube is required; the diameter and thickness of the patch can be varied at will by regulation of the pressure in the tube or the amount of sealing composition forced from the applying tool or gun and that the puncture opening in the casing is repaired simultaneously with the repair of the inner tube so as to prevent the entrance of moisture and other foreign materials.

While a specific form of the improvement has been described and illustrated herein, it is to be understood that the same may be varied, within the scope of the appended claims, without departing from the spirit of the invention.

Having thus described the invention, what is claimed and desired secured by Letters Patent is:

1. A method of repairing punctures in vehicle tires of the type having an outer casing enclosing an inner tube, comprising: the steps of inflating the inner tube within the casing; and forcing a puncture sealing compound through the puncture in the outer casing against the puncture in the inner tube with sufficient pressure to force the compound between the tube and the casing to form an outer patch on the tube, and through the tube to form an inner patch thereon.

2. A tire repair device comprising: a tubular barrel; a discharge tube extending from one extremity of said barrel; an annular nozzle on the extremity of said tube; two oppositely projecting flat wing members formed on said tube adjacent said nozzle to engage the walls of a groove of the tire for steadying the device and to prevent the nozzle from being forced through a puncture passage in the groove of said tire; a cap closing the other extremity of said barrel; a piston rod extending through said cap; and a piston mounted on said rod for forcing puncture sealing compound from said barrel through said discharge tube.

3. A method of repairing punctures in pneumatic tires having a casing and an inner tube, comprising the steps of inflating the inner tube within the casing and forcing a puncture sealing compound through the puncture in the casing and against the puncture in the inner tube, and forming a sealing patch on the inner tube and between the outer wall of the inner tube and the inner wall of the casing.

4. A method of repairing punctures in pneumatic tires having a casing and an inner tube, comprising the steps of inflating the inner tube within the casing to a degree of pressure sufficient for the tube to bear against the inner wall of the casing but less than the operating pressure thereof, and forcing a puncture sealing compound through the puncture in the casing and against the puncture in the inner tube, and forming a sealing patch on the inner tube and between the outer wall of the inner tube and the inner wall of the casing, and inflating the inner tube to operating pressure after a predetermined length of time.

CHAUNCEY E. NOTZ.

References Cited in the file of this patent

UNITED STATES PATENTS

| Number | Name | Date |
|---|---|---|
| 591,443 | White | Oct. 12, 1897 |
| 610,594 | Whitbeck | Sept. 13, 1898 |
| 1,348,005 | Hirst | July 27, 1920 |
| 1,530,843 | Meredith | Mar. 24, 1925 |
| 2,343,838 | Wilson | Mar. 7, 1944 |